April 28, 1936.  A. J. GÉNY  2,038,897
GEAR CUTTER FOR THE CUTTING OF CURVED TEETH GEARS
Filed Jan. 18, 1935
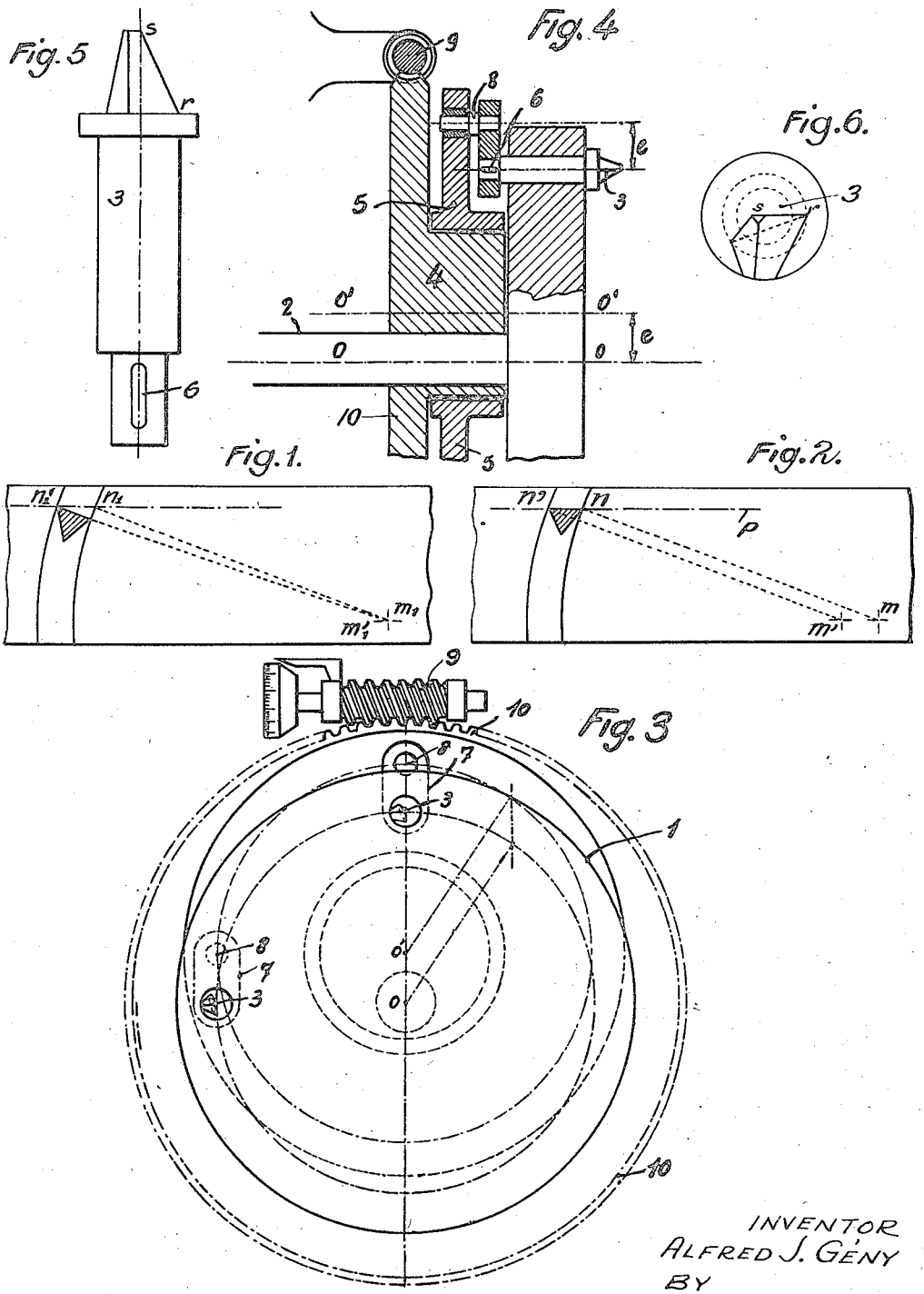

Patented Apr. 28, 1936

2,038,897

UNITED STATES PATENT OFFICE 2,038,897

GEAR CUTTER FOR THE CUTTING OF CURVED TEETH GEARS

Alfred Joseph Gény, Amiens, France

Application January 18, 1935, Serial No. 2,362
In France January 31, 1934

3 Claims. (Cl. 90—1)

The cutters actually in use accomplish the cutting of curved gear teeth either in one simple operation and in that case they produce imperfect side surfaces which give an interrupted and broken contact or with greater accuracy in two operations and then necessitate in some cases the use of a plurality of cutters.

One object of the present invention is to produce in one single operation and by means of a single cutter accurate gear teeth provided with sides having a continuously parallel directrix resulting in an uninterrupted line of contact along the whole length of the tooth.

Another object of my invention is to make it possible in the manufacturing of gears to cut conjugate gears with the same cutter by simply reversing the machine and cutting with the opposite side of the cutter.

To this end the present invention has also for its object to provide a cutter which comprises a supporting disk for the cutting tools substantially characterized by the fact that said tools are caused to revolve in such a manner that their working edge always remains in parallel with itself during the rotation of the circular disk, said movement of the tool being produced by a suitable mechanism in combination with the revolving of the tools around the axis of the disk.

Referring to the accompanying drawing forming a part of this specification in which similar characters of reference indicate corresponding parts in all the views.

Fig. 1 illustrates a recess cut out in the usual manner by means of a cutter having fixed tools.

Fig. 2 illustrates a recess cut out with a cutter provided with rotary tools according to the present invention.

Fig. 3 is a front view showing one mode of execution of the cutter given by way of example.

Fig. 4 is a diametrical sectional view of same.

Figs. 5 and 6 are respectively an elevation and a plan view of a tool.

Referring first to Fig. 1 it will be seen that when cutting by means of a tool fixed upon the cutter, the curvature radii $m_1$ $n_1$ and $m_1'$, $n_1'$ are not equal and that the contact along the tooth must necessarily be interrupted.

In contradistinction as illustrated in Fig. 2, the recesses formed by the revolving tools carried by the present cutter, in which the cutting edge $n$, $n'$ always remains in parallel with itself, have sides whose directrix are always in parallel with equal curvature radii $m$—$n$, $m'$—$n'$ for two points located in a plane P perpendicular to the gear axis.

This result is achieved owing to the arrangement upon a revolving circular disk 1 (Figs. 3 and 4) provided with a feed shank 2; of tools 3 revolving around their axis which is in parallel with that of the cutter, said tools revolving upon themselves during one turn of the cutter in such a manner that their cutting edge $r$ $s$ (Figs. 5 and 6) always remain parallel to itself.

The revolution of the tools in the above mentioned conditions may be produced by means of various mechanical devices, such as planet wheels drawn by the cutter and meshing with a stationary gear, deformable parallelograms, each maintaining a tool in a fixed direction. This last mode of execution is illustrated in Figs. 3 and 4.

The cutter may be provided with one or more sets of tools each set engaging one recess per revolution of the cutter.

According to the results to be attained the cutting portions of the tools may be placed circularly or helically, their bodies always remaining placed in a circle.

The tools 3 may rotate directly in the circular disk 1 or may be rotated by the intermediary of tool carriers so as to facilitate the taking to pieces and the grinding of the tools.

In the mode of execution illustrated by way of example the tools rotate directly in the cutter. For the sake of clearness, one tool only has been shown in Fig. 4 and two in Fig. 3.

An eccentric 4, whose eccentricity is $OO'=e$ which is fixed when in operation is rotatively mounted upon the cutter shank 2. A plate 5 rotates upon said eccentric and therefore around its shaft.

The shank of every tool 3 is keyed at 6 upon a crank 7 connected by means of a spindle 8 to the plate 5 said spindle freely rotating in said plate. The length of the crank shaft, that is the distance between the axis of a tool 3 and that of the spindle 8 is equal to the eccentricity $e$ and the spindles are all embedded upon the plate 5 along the same circumference.

The eccentric 4 having been made stationary through the rotation of the cutter, the tools 3 describe a circle having a center O' and the same radius as the first one but displaced relatively to it of a quantity which is equal to the eccentricity $e$. Fig. 3 shows that the system O—O'—3—8 forms a deformable parallelogram which causes the corresponding tool to always remain parallel to itself while revolving around its own axis.

The eccentric 4 which is stationary relatively to the frame during the operation may however take various positions around the shank 2 of the circular disk 1 which as they previously deform the parallelogram O—O'—3—8 allow of giving various inclinations to the cutting sides of the tools more especially so as to bring said sides in a convenient position to allow of effecting the grinding upon the machine itself.

The eccentric may be maintained stationary either by means of a latch carried upon the frame or of an endless screw 9 in mesh with a toothed plate 10 integral with said eccentric which will consequently assist in bringing the latter with great accuracy in the desired position. A scale engraved upon the head of the screw 9 will facilitate a fine adjustment of the parts.

The cutter constructed according to the present invention has consequently the following advantages; the cutting in one single operation of gears with curved teeth together with the production of an accurate profile and uninterrupted contact; the cutting with one and the same cutter of conjugated gears by simply reversing the machine and causing the engagement of the work piece by the opposite side of the cutter; the possibility of effecting the grinding without difficulty upon the machine itself.

What I claim and desire to secure by Letters Patent of the United States is:

1. A cutter for the cutting of bevel gears with curved teeth which comprises: a circular disk, a rotary shaft for said disk, cutting tools, a spindle for every tool, said spindles being rotatively mounted in the circular disk in parallel with the axis of same and along the same circumference, a fixed eccentric engaged upon the disk shaft, a plate mounted upon said eccentric, pins in number equal to that of the tools rotatively mounted in said disk along the same circumference, and a crank having a length which is equal to the eccentricity of the eccentric, for connecting the spindle of each tool to the corresponding pin said crank being fixed upon said spindle and loose upon said pin.

2. A cutter for the cutting of bevel gears with curved teeth which comprises: a circular disk, a rotary shaft for said disk, cutting tools, a spindle for every tool, said spindles being rotatively mounted in the circular disk in parallel with the axis of same and along the same circumference, a fixed eccentric engaged upon the disk shaft, a plate mounted upon said eccentric, pins in number equal to that of the tools rotatively mounted in said disk along the same circumference, and a crank having a length which is equal to the eccentricity of the eccentric, for connecting the spindle of each tool to the corresponding pin said crank being fixed upon said spindle and loose upon said pin and means to previously change the position of the eccentric and consequently the inclination of the cutting faces of the tools.

3. A cutter for the cutting of bevel gears with curved teeth which comprises: a circular disk, a rotary shaft for said disk, cutting tools, a spindle for every tool, said spindles being rotatively mounted in the circular disk in parallel with the axis of same and along the same circumference, an eccentric engaged upon the shaft of the circular disk, a toothed gear integral with said eccentric, an endless screw in engagement with said wheel and a graduated knob for adjusting said screw, a plate mounted upon said eccentric, pins in number equal to that of the tools rotatively mounted in said disk along the same circumference and a crank having a length which is equal to the eccentricity of the eccentric, for connecting the spindle of each tool to the corresponding pin, said crank being fixed upon said spindle and loose upon said pin.

ALFRED JOSEPH GÉNY.